US012744010B2

(12) United States Patent
Wu

(10) Patent No.: US 12,744,010 B2
(45) Date of Patent: Sep. 22, 2026

(54) DISPLAY DRIVING DEVICE AND BRIGHTNESS COMPENSATION METHOD

(71) Applicant: HIMAX TECHNOLOGIES LIMITED, Tainan City (TW)

(72) Inventor: Tung-Ying Wu, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/026,178

(22) Filed: Jan. 16, 2025

(65) Prior Publication Data

US 2026/0204232 A1 Jul. 16, 2026

(51) Int. Cl.
*G09G 3/34* (2006.01)

(52) U.S. Cl.
CPC ... *G09G 3/3406* (2013.01); *G09G 2320/0233* (2013.01); *G09G 2360/16* (2013.01)

(58) Field of Classification Search
CPC ......... G09G 3/3406; G09G 2320/0233; G09G 2360/16
See application file for complete search history.

(56) References Cited

U.S. PATENT DOCUMENTS 9,131,197 B2 * 9/2015 Mine ........................ H04N 23/71
9,336,728 B2 * 5/2016 Neal ..................... G09G 3/3426
10,269,308 B2 * 4/2019 Yang ..................... G09G 3/3607
11,164,543 B1 * 11/2021 Gao ..................... G09G 3/2074
11,270,665 B2 * 3/2022 Lee ........................... G09G 3/20
12,094,432 B1 * 9/2024 Furihata ............... G09G 3/3607
2008/0036797 A1 * 2/2008 Whang .................. G09G 3/006
345/698
2011/0074834 A1 * 3/2011 Chen ........................ G09G 3/22
345/690
2011/0181787 A1 * 7/2011 Wang ..................... H04N 5/202
348/673
2011/0279469 A1 * 11/2011 Hao ....................... G06Q 10/06
715/833
2011/0279482 A1 * 11/2011 Neal .................... G09G 3/3426
315/291
2014/0055505 A1 * 2/2014 Ikeda ....................... G09G 3/22
345/690
2014/0085360 A1 * 3/2014 Ohno ....................... G09G 3/36
345/694
2014/0146071 A1 * 5/2014 Kim ..................... G09G 3/3225
345/589
2015/0103108 A1 * 4/2015 Seong .................. G09G 3/3208
345/694
(Continued)

*Primary Examiner* — Benyam Ketema
(74) *Attorney, Agent, or Firm* — JCIPRNET

(57) ABSTRACT

A display driving device and a brightness compensation method are provided. The display driving device includes a brightness calculation module and a brightness boost module. The brightness calculation module is configured to calculate a plurality of brightness difference values between a first block and a plurality of second blocks adjacent to the first block, and calculate an average difference value of the plurality of brightness difference values. The brightness boost module is coupled to the brightness calculation module, and configured to obtain a brightness boost value according to the average difference value and an original brightness value of the first block. The brightness boost module is configured to boost a brightness of the first block according to the brightness boost value.

18 Claims, 5 Drawing Sheets

(56) References Cited

U.S. PATENT DOCUMENTS

2015/0269895 A1* 9/2015 Kao .................... G09G 3/3426
345/690
2016/0071487 A1* 3/2016 Lu ........................ G09G 3/3208
345/82
2016/0182870 A1* 6/2016 Ito ........................ H04N 9/3147
348/208.4
2016/0210912 A1* 7/2016 Tada .................... G09G 3/3648
2017/0061897 A1* 3/2017 Zhang .................. G09G 3/3426
2017/0061902 A1* 3/2017 Zhang .................. G09G 3/3426
2017/0084232 A1* 3/2017 Yang .................... G09G 3/3426
2018/0188605 A1* 7/2018 Chu ..................... G09G 3/3426
2019/0103062 A1* 4/2019 Li .......................... G01K 13/00
2019/0130825 A1* 5/2019 Pyo ...................... G09G 3/3233
2021/0012720 A1* 1/2021 Kang ................ G02F 1/133602
2021/0110752 A1* 4/2021 Kim ..................... G09G 3/2003
2021/0183333 A1* 6/2021 Holland ............... G09G 3/3208
2021/0233491 A1* 7/2021 Lee .......................... G09G 5/10
2021/0407368 A1* 12/2021 Gao ..................... G09G 3/3685
2023/0077136 A1* 3/2023 Wang ................... G09G 3/3426
2023/0139387 A1* 5/2023 Jun ...................... G09G 3/2092
345/690
2023/0162667 A1* 5/2023 Park ..................... G09G 3/3208
365/189.05
2023/0215403 A1* 7/2023 Zhang ...................... G09G 3/36
345/690
2023/0222970 A1* 7/2023 Choi .................... G09G 3/2007
345/694
2024/0038183 A1* 2/2024 Furihata ............... G09G 3/3426
2024/0046835 A1* 2/2024 Zhang ...................... G09G 3/20
2024/0203314 A1* 6/2024 Hou ..................... G09G 3/3208
2024/0203368 A1* 6/2024 Orio ....................... G09G 3/342
2024/0312395 A1* 9/2024 Kim ..................... G09G 3/2096
2024/0339064 A1* 10/2024 Lin ...................... G09G 3/2074
2025/0087128 A1* 3/2025 Wu ...................... G09G 3/2074

* cited by examiner

DISPLAY DRIVING DEVICE AND BRIGHTNESS COMPENSATION METHOD

BACKGROUND

Technical Field

The disclosure relates to a device, and particularly relates to a display driving device and a brightness compensation method.

Description of Related Art

In the conventional technology, the display device with the backlight module may have non-uniform brightness problems. In particular, when the display device displays the spot or the bright small object, the visual effect of the display device may suffer from the problem of insufficient brightness of the visual small objects. Or, when the display device displays the large bright object, the visual effect of the display device may suffer from the problem of brightness nonuniform caused by insufficient visual accuracy of large object boundaries.

SUMMARY

The disclosure is directed to a display driving device and a brightness compensation method, which are adapted to provide a better display effects.

The display driving device of the disclosure includes a brightness calculation module and a brightness boost module. The brightness calculation module is configured to calculate a plurality of brightness difference values between a first block and a plurality of second blocks adjacent to the first block, and calculate an average difference value of the plurality of brightness difference values. The brightness boost module is coupled to the brightness calculation module. The brightness boost module is configured to obtain a brightness boost value according to the average difference value and an original brightness value of the first block. The brightness boost module is configured to boost a brightness of the first block according to the brightness boost value.

The brightness compensation method of the disclosure includes the following step: calculating a plurality of brightness difference values between a first block and a plurality of second blocks adjacent to the first block; calculating an average difference value of the plurality of brightness difference values; obtaining a brightness boost value according to the average difference value and an original brightness value of the first block; and boosting a brightness of the first block according to the brightness boost value.

Based on the above, the display driving device and the brightness compensation method of the disclosure may automatically compensate for display brightness to achieve good visual brightness effects.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
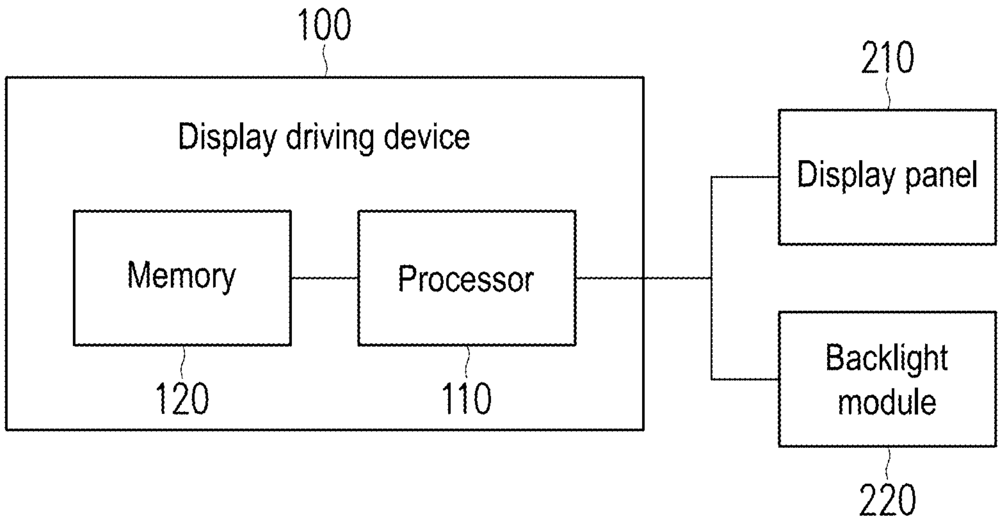
FIG. 1 is a schematic diagram of a display driving device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . "

The term "coupling (or electrically connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a display driving device according to an embodiment of the disclosure. Referring to FIG. 1, the display driving device 100 includes a processor 110 and a memory 120. The processor 110 is coupled to the memory 120. In the embodiment of the disclosure, the display driving device 100 is a timing controller (TCON), and the processor 110 is further coupled to a display panel 210 and a backlight module 220. In the embodiment of the disclosure, the display driving device 100 may perform a local dinning operation to adjust and control the display panel 210 and the backlight module 220. In the local dinning operation, the processor 110 may receive an input image data from an image source, and the processor 110 may analysis the input image data to perform brightness compensation and generate an output image data. The processor 110 may drive the display panel 210 and the backlight module 220 according to the output image data with compensated brightness parameters.

In the embodiment of the disclosure, the processor 110 may be a field programmable gate array (FPGA), an application-specific integrated circuit (ASIC), or a micro-controller. The memory 120 may be a static random-access memory (SRAM), a dynamic random-access memory (DRAM), a synchronized dynamic random-access memory (SDRAM), or a flash memory. In the embodiment of the disclosure, the display panel 210 may be a liquid-crystal display (LCD) panel, but the disclosure is not limited thereto. The backlight module 220 may be a light emitting diode (LED) backlight panel or a mini-LED backlight panel, but the disclosure is also not limited thereto.

In the embodiment of the disclosure, the backlight module 220 may include a plurality of light emitting units, and the plurality of light emitting units may be arranged in an array to form a block array. Each of the plurality of blocks may correspond to one or more pixels or sub-pixels of the display panel 210 to provide illumination light to the one or more pixels or sub-pixels one the display panel 210. In the embodiment of the disclosure, the processor 110 may be configured to control the backlight module 220 to automatically adjust the illumination light, so as to compensate for display brightness.

Figure 2:
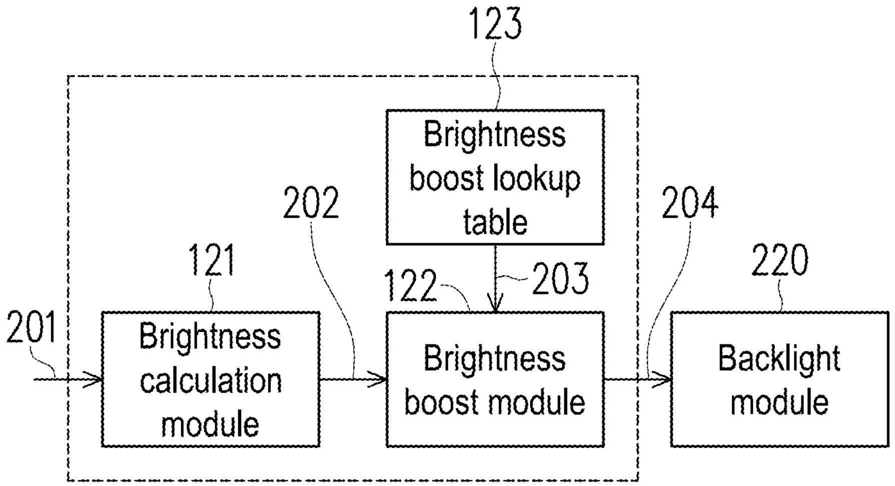
FIG. 2 is a schematic diagram of a plurality of modules according to an embodiment of the disclosure.

FIG. 2 is a schematic diagram of a plurality of modules according to an embodiment of the disclosure. Referring to FIG. 1 and FIG. 2, the memory 120 may store an accumulation module 131, a brightness calculation module 121, a brightness boost module 122 and a brightness boost lookup table 123 for reading and executing by the processor 110. In one embodiment of the disclosure, at least one of the brightness calculation module 121, a brightness boost module 122 and a brightness boost lookup table 123 may also be implemented in the form of specific functional circuits.

Figure 3:
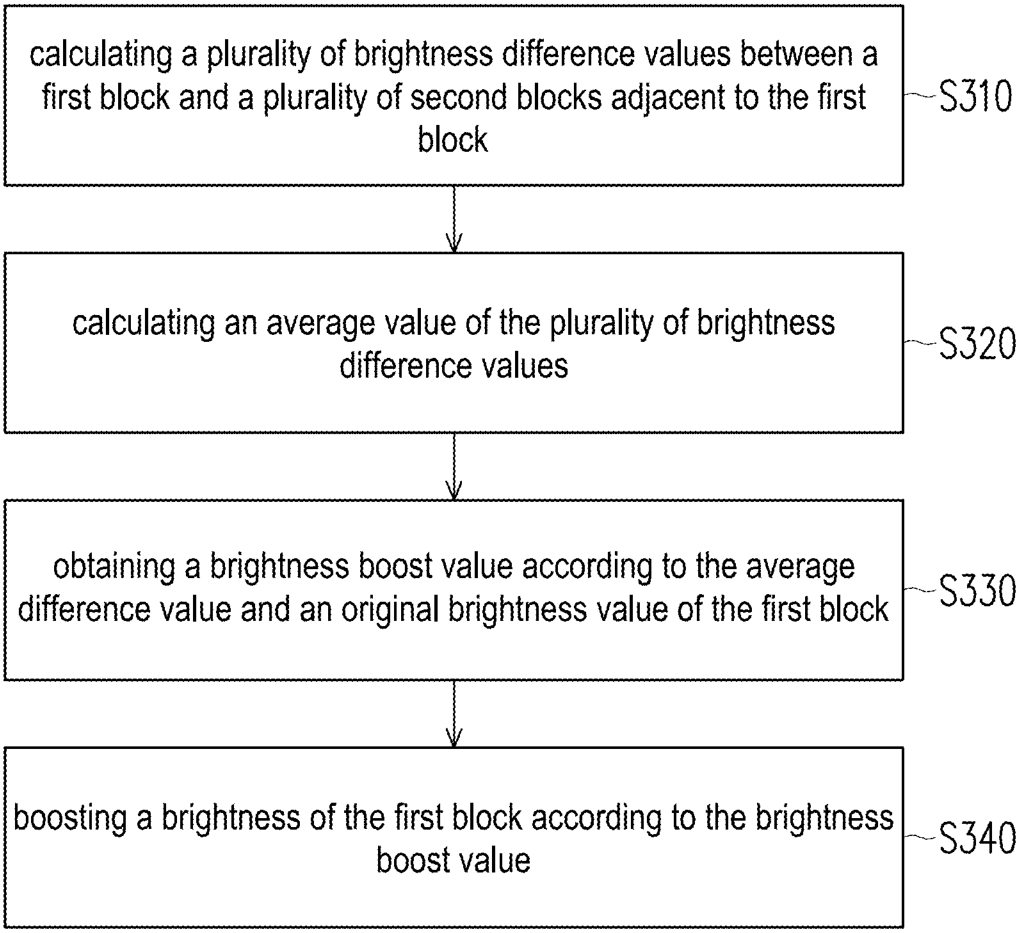
FIG. 3 is a flowchart of a brightness compensation method according to an embodiment of the disclosure.
Figure 4:
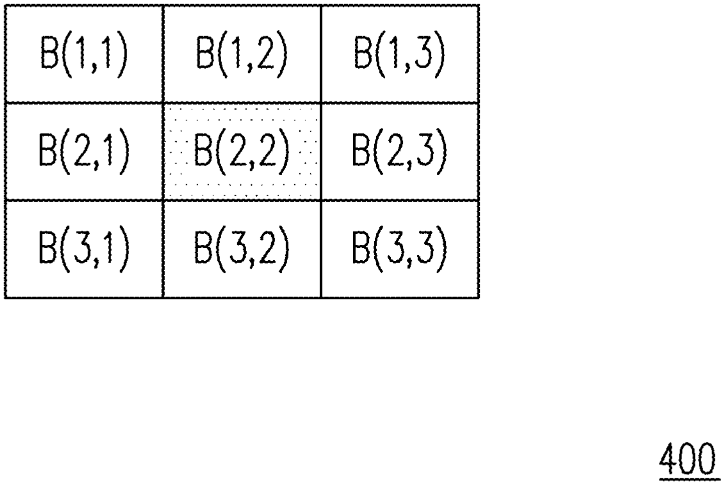
FIG. 4 is a schematic diagram of a plurality of blocks according to an embodiment of the disclosure.

FIG. 3 is a flowchart of a brightness compensation method according to an embodiment of the disclosure. FIG. 4 is a schematic diagram of a plurality of blocks according to an embodiment of the disclosure. Referring to FIG. 1 to FIG. 4, the display driving device 100 may receive an input image data 201. In the embodiment of the disclosure, the brightness calculation module 121 may analysis the brightness value of each block and the brightness values of its adjacent blocks on each frame of the input image data 201. The display driving device 100 may perform the following steps S310 to S340 on the each block on the each frame of the input image data 201 to determine whether to boost (increase) the brightness. It should be moted that, the brightness of the block may correspond to a duty of a driving current of the backlight module 220.

The following description takes a first block B(2,2), and a plurality of second blocks B(1,1), B(1,2), B(1,3), B(2,1), B(2,3), B(3,1), B(3,2) and B(3,3) as an example. In step S310, the brightness calculation module 121 calculates a plurality of brightness difference values between the first block B(2,2) and the plurality of second blocks B(1,1), B(1,2), B(1,3), B(2,1), B(2,3), B(3,1), B(3,2) and B(3,3) adjacent to the first block B(2,2). In the embodiment of the disclosure, a distance between each of the second blocks B(1,1), B(1,2), B(1,3), B(2,1), B(2,3), B(3,1), B(3,2) and B(3,3) and the first block B(2,2) on the block array is one block distance, but the disclosure is not limited thereto. In one embodiment of the disclosure, the brightness calculation module 121 may execute the following formulas (1) to (8) to obtain the brightness difference values ΔBd(1,1) to ΔBd (3,3), where Bv(1,1) to Bv(3,3) are original brightness values of the first block B(2,2) and the second blocks B(1,1), B(1,2), B(1,3), B(2,1), B(2,3), B(3,1), B(3,2) and B(3,3).

$$\Delta Bd(1,1) = Bv(2,2) - Bv(1,1) \quad (1)$$

$$\Delta Bd(1,2) = Bv(2,2) - Bv(1,2) \quad (2)$$

$$\Delta Bd(1,3) = Bv(2,2) - Bv(1,3) \quad (3)$$

$$\Delta Bd(2,1) = Bv(2,2) - Bv(2,1) \quad (4)$$

-continued $$\Delta Bd(2,3) = Bv(2,2) - Bv(2,3) \quad (5)$$

$$\Delta Bd(3,1) = Bv(2,2) - Bv(3,1) \quad (6)$$

$$\Delta Bd(3,2) = Bv(2,2) - Bv(3,2) \quad (7)$$

$$\Delta Bd(3,3) = Bv(2,2) - Bv(3,3) \quad (8)$$

In step S320, the brightness calculation module 121 calculates an average difference value 202 of the plurality of brightness difference values. In one embodiment of the disclosure, the brightness calculation module 121 may execute the following formula (9) to obtain the average difference value ΔBd.

$$\overline{\Delta Bd} = (\Delta Bd(1,1) + \Delta Bd(1,2) + \Delta Bd(1,3) + \Delta Bd(2,1) + \Delta Bd(2,3) + \Delta Bd(3,1) + \Delta Bd(3,2) + \Delta Bd(3,3)/8 \quad (9)$$

In step S330, the brightness boost module 122 obtains a brightness boost value 203 according to the average difference value 202 and an original brightness value of the first block B(2,2). In the embodiment of the disclosure, the brightness boost module 122 obtains the brightness boost value 203 (i.e. ΔBd) by searching the brightness boost lookup table 123 according to the average difference value 202 and the original brightness value of the first block B(2,2) (i.e. Bv(2,2)). In the embodiment of the disclosure, the brightness boost lookup table 123 may have a plurality of new brightness boost values, and the brightness boost module 122 may replace the original brightness value of the first block B(2,2) by the corresponding new brightness boost value.

For example, the brightness boost lookup table 123 may be implemented as a following table 1. If the original brightness value of the first block B(2,2) is 64, and the brightness boost value ΔBd is 240, so that the brightness boost module 122 may obtain the new brightness value of the first block B(2,2) "84". In addition, if the original brightness value of the first block B(2,2) and/or the brightness boost value ΔBd is between two values in the table 1, the brightness boost module 122 may also calculate the corresponding new brightness value through interpolation.

TABLE 1

| | ΔBd | | | | |
|---|---|---|---|---|---|
| Bv | 0 | 64 | . . . | 240 | 255 |
| 0 | 0 | 0 | . . . | 0 | 0 |
| 64 | 64 | 68 | . . . | 84 | 96 |
| . . . | . . . | . . . | . . . | . . . | . . . |
| 240 | 240 | 248 | . . . | 468 | 480 |
| 255 | 255 | 265 | . . . | 486 | 511 |

In one embodiment of the disclosure, the brightness boost lookup table 123 may also have a plurality of brightness boost values (i.e. the brightness compensation values), and the brightness boost module 122 may add the corresponding brightness boost value to the original brightness value of the first block to obtain a new brightness value of the first block.

In addition, it should be noted that, in the embodiment of the disclosure, if the average difference value of the plurality of brightness difference values is less than 0, the brightness boost module 122 may maintain the brightness of the first block.

In step S340, the brightness boost module 122 boosts a brightness of the first block according to the brightness boost value 203. In the embodiment of the disclosure, the brightness boost module 122 may output the output image data 204 with compensated brightness parameters to the backlight module 220. In the embodiment of the disclosure, the brightness boost module 122 may adjust a current value of the driving current for driving corresponding block unit on the backlight module 220 according to the brightness boost value, but the disclosure is not limited thereto. In one embodiment of the disclosure, the brightness boost module 122 may adjust a pulse width of the driving current (i.e. the duty of the driving current) for driving corresponding block unit on the backlight module 220 according to the brightness boost value.

In the embodiment of the disclosure, the brightness calculation module 121 may calculate the average difference value of each block of the input image data 201, and the brightness boost module 122 may individually determine whether to boost the brightness of each block of the input image data based on the average difference value of each block. Therefore, the backlight module 220 may provide good backlighting effect according to the output image data 204.

Figure 5:
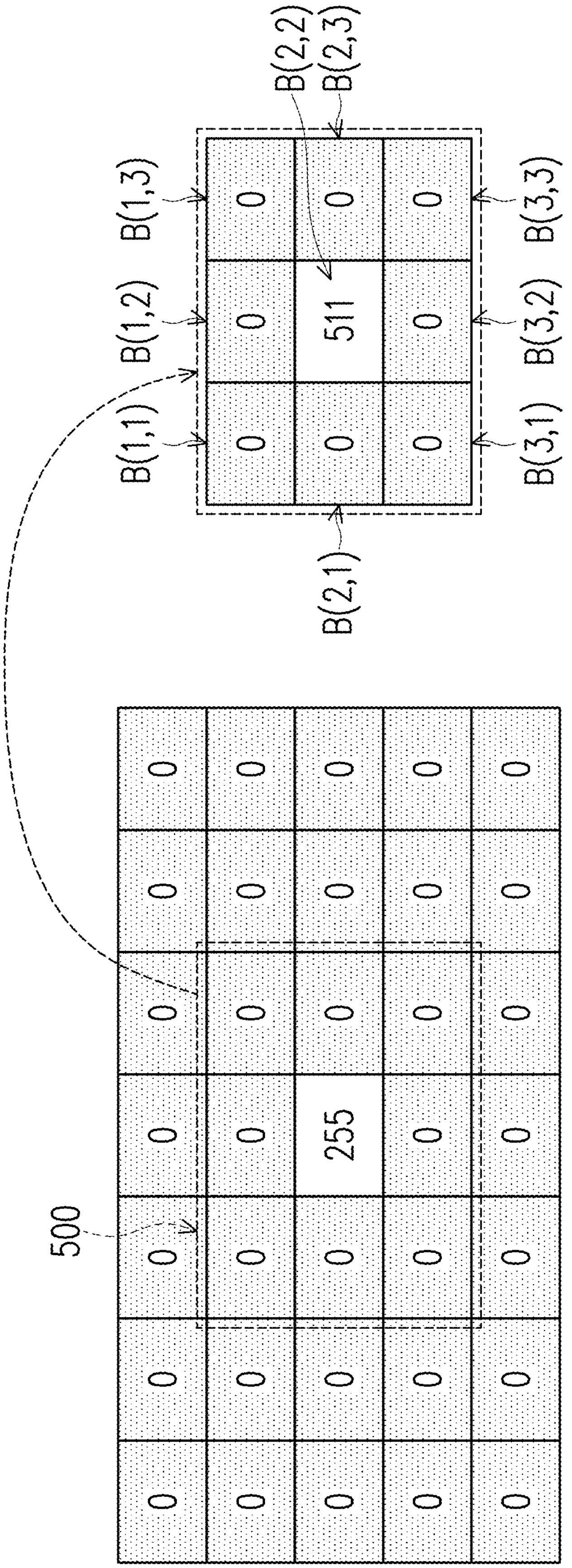
FIG. 5 is a schematic diagram of brightness compensation according to an embodiment of the disclosure.

FIG. 5 is a schematic diagram of brightness compensation according to an embodiment of the disclosure. Referring to FIG. 1, FIG. 3 and FIG. 5, for example, one currently frame image may have a plurality of brightness values corresponding to a plurality of blocks as shown in FIG. 5. Tacking a partial block array 500 as an example, the original brightness value of the block B(2,2) may be 255, and the original brightness values of the blocks B(1,1), B(1,2), B(1,3), B(2,1), B(2,3), B(3,1), B(3,2) and B(3,3) may be 0. The brightness calculation module 121 may calculate the average difference value the plurality of brightness difference values between the block B(2,2) and the blocks B(1,1), B(1,2), B(1,3), B(2,1), B(2,3), B(3,1), B(3,2) and B(3,3) by the above formulas (1) to (9), and the average difference value may be 255. Then, the brightness boost module 122 may obtain the brightness boost value, for example, from the above table 1 according to the original brightness value and the average difference value, and the brightness boost value may be 511. Therefore, the brightness boost module 122 replaces the brightness value of the block B(2,2) by 511.

Moreover, due to the brightness values of the blocks B(1,1), B(1,2), B(1,3), B(2,1), B(2,3), B(3,1), B(3,2) and B(3,3) are less then its adjacent blocks, the brightness boost module 122 may maintain the brightness of the blocks B(1,1), B(1,2), B(1,3), B(2,1), B(2,3), B(3,1), B(3,2) and B(3,3). That is, the display driving device 100 may effectively increase spot or bright small object brightness in the display screen, so as to effectively improve the problem of insufficient brightness of small visual objects.

Figure 6:
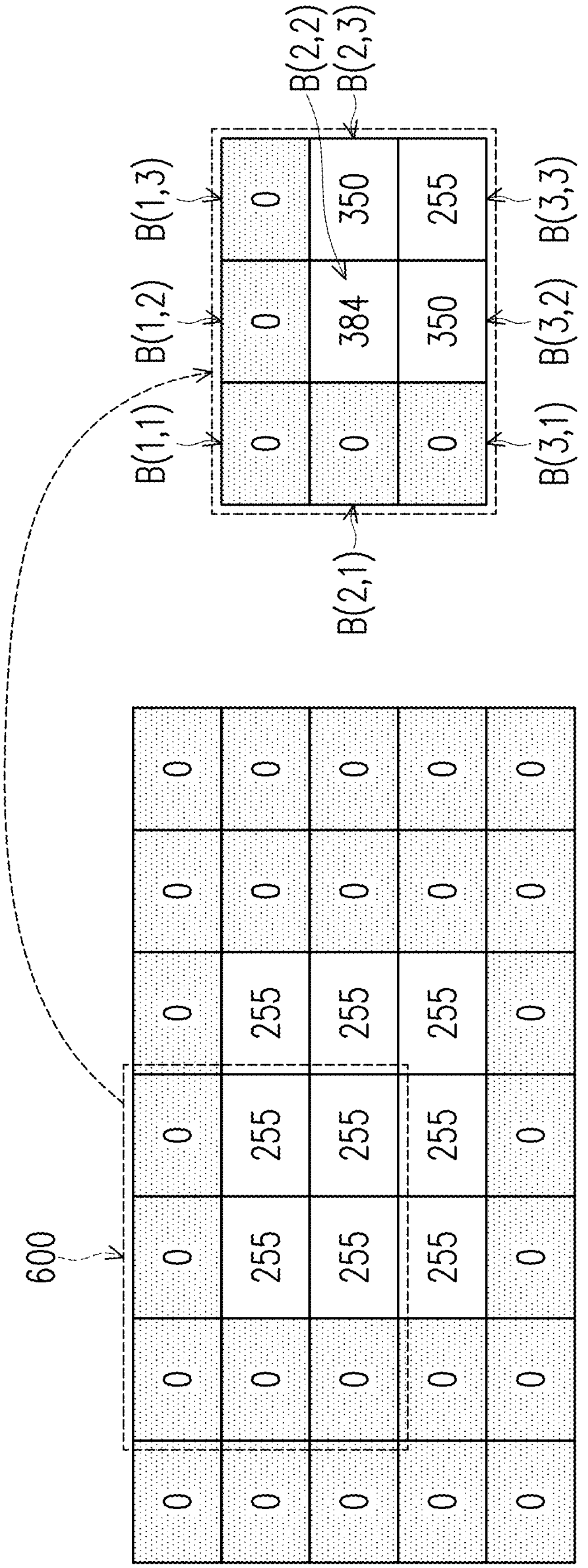
FIG. 6 is a schematic diagram of brightness compensation according to another embodiment of the disclosure.

FIG. 6 is a schematic diagram of brightness compensation according to another embodiment of the disclosure. Referring to FIG. 1, FIG. 3 and FIG. 6, for example, one currently frame image may have a plurality of brightness values corresponding to a plurality of blocks as shown in FIG. 6. Tacking a partial block array 600 as an example, the original brightness values of the blocks B(2,2), B(2,3), B(3,2), and B(3,3) may be 255, and the original brightness values of the blocks B(1,1), B(1,2), B(1,3), B(2,1), and B(3,1) may be 0. The brightness calculation module 121 may calculate the average difference value the plurality of brightness difference values between the block B(2,2) and the blocks B(1,1), B(1,2), B(1,3), B(2,1), B(2,3), B(3,1), B(3,2) and B(3,3) by the above formulas (1) to (9), and the average difference value may be approximately 159. Then, the brightness boost module 122 may obtain the brightness boost value, for example, from the above table 1 according to the original brightness value and the average difference value, and the brightness boost value may be 384. Therefore, the brightness boost module 122 replaces the brightness value of the block B(2,2) by 384.

Moreover, the brightness boost module 122 may also correspondingly adjust the brightness values of the blocks B(2,3), B(3,2), and B(3,3), and the brightness boost module 122 may maintain the brightness of the blocks B(1,1), B(1,2), B(1,3), B(2,1) and B(3,1). That is, the display driving device 100 may effectively keep the large bright object visual uniformity in the display screen, so as to effectively improve the problem of brightness nonuniform caused by insufficient visual accuracy of large object boundaries.

In summary, the display driving device and the brightness compensation method of the disclosure may automatically compensate for brightness of the blocks of the image in each frame to achieve good visual brightness effects. In particular, the display driving device and the brightness compensation method of the disclosure may effectively increase spot or bright small object brightness in the display screen, and effectively keep the large bright object visual uniformity in the display screen.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driving device, comprising:

a brightness calculation module, configured to calculate a plurality of brightness difference values between a first block and a plurality of second blocks adjacent to the first block by subtracting an original brightness value of each of the plurality of second blocks from an original brightness value of the first block, and calculate an average difference value of the plurality of brightness difference values; and a brightness boost module, coupled to the brightness calculation module, and configured to obtain a brightness boost value according to the average difference value and the original brightness value of the first block, wherein the brightness boost module is configured to boost a brightness of the first block according to the brightness boost value, wherein when the average difference value of the plurality of brightness difference values is less than 0, the brightness boost module is configured to maintain the brightness of the first block.

2. The display driving device according to claim 1, wherein the brightness of the first block corresponds to a duty of a driving current of a backlight module.

3. The display driving device according to claim 2, wherein the brightness boost module is configured to adjust a current value of the driving current according to the brightness boost value.

4. The display driving device according to claim 2, wherein the brightness boost module is configured to adjust a pulse width of the driving current according to the brightness boost value.

5. The display driving device according to claim 1, wherein the brightness boost module is configured to obtain the brightness boost value by searching a brightness boost lookup table according to the average difference value and the original brightness value of the first block.

6. The display driving device according to claim 1, wherein the brightness boost module is configured to replace the original brightness value of the first block by the brightness boost value.

7. The display driving device according to claim 1, wherein the brightness boost module is configured to add the brightness boost value to the original brightness value of the first block to obtain a new brightness value of the first block.

8. The display driving device according to claim 1, wherein a distance between each of the second blocks and the first block on a block array is one block distance.

9. The display driving device according to claim 1, wherein the display driving device is configured to receive an input image data, and the brightness calculation module is configured to calculate the average difference value of each block of the input image data, and the brightness boost module is configured to individually determine whether to boost the brightness of each block of the input image data based on the average difference value of each block.

10. A brightness compensation method, comprising:

calculating a plurality of brightness difference values between a first block and a plurality of second blocks adjacent to the first block by subtracting an original brightness value of each of the plurality of second blocks from an original brightness value of the first block;

calculating an average difference value of the plurality of brightness difference values;

obtaining a brightness boost value according to the average difference value and the original brightness value of the first block;

boosting a brightness of the first block according to the brightness boost value; and when the average difference value of the plurality of brightness difference values is less than 0, maintaining the brightness of the first block.

11. The brightness compensation method according to claim 10, wherein the brightness of the first block corresponds to a duty of a driving current of a backlight module.

12. The brightness compensation method according to claim 11, wherein the step of boosting the brightness of the first block comprises:

adjusting a current value of the driving current according to the brightness boost value.

13. The brightness compensation method according to claim 11, wherein the step of boosting the brightness of the first block comprises:

adjusting a pulse width of the driving current according to the brightness boost value.

14. The brightness compensation method according to claim 10, wherein the step of obtaining the brightness boost value comprises:

obtaining the brightness boost value by searching a brightness boost lookup table according to the average difference value and the original brightness value of the first block.

15. The brightness compensation method according to claim 10, further comprising:

replacing the original brightness value of the first block by the brightness boost value.

16. The brightness compensation method according to claim 10, further comprising:

adding the brightness boost value to the original brightness value of the first block to obtain a new brightness value of the first block.

17. The brightness compensation method according to claim 10, wherein a distance between each of the second blocks and the first block on a block array is one block distance.

18. The brightness compensation method according to claim 10, further comprising:

receiving an input image data;

calculating the average difference value of each block of the input image data; and individually determining whether to boost the brightness of each block of the input image data based on the average difference value of each block.

* * * * *